Feb. 11, 1958 L. MALTER 2,823,306
DETECTOR CIRCUIT
Filed April 13, 1953
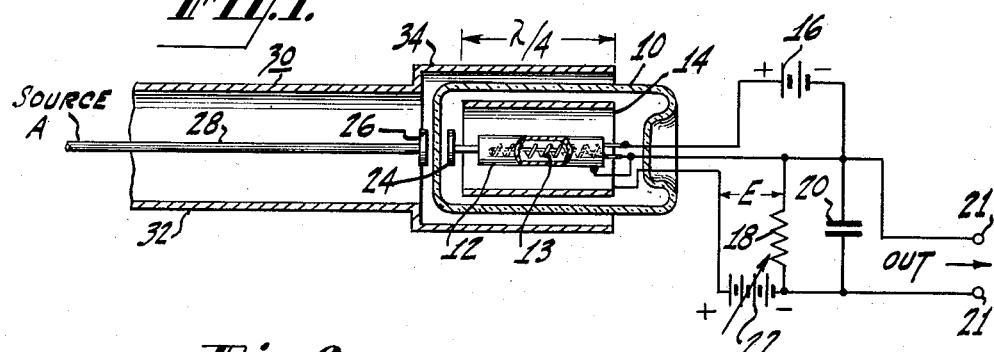
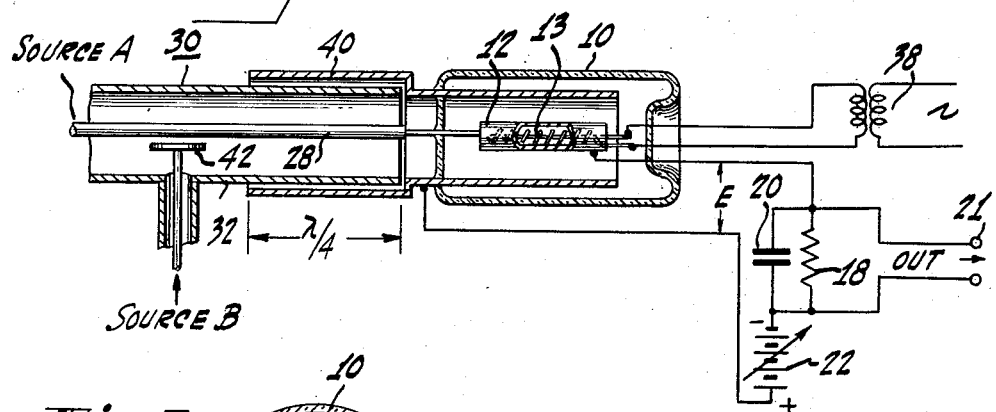
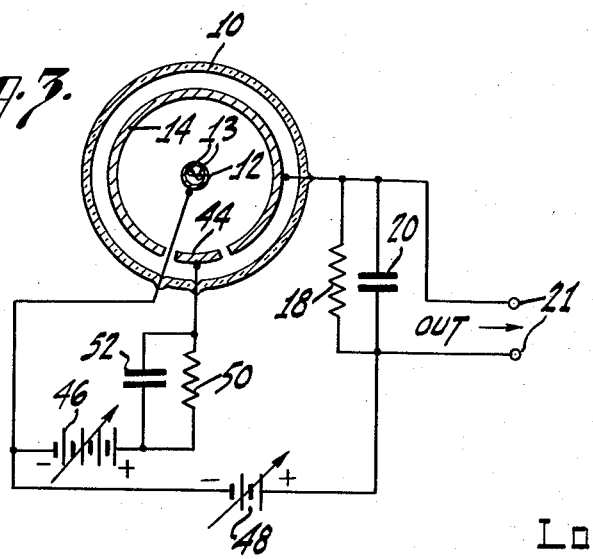
INVENTOR.
LOUIS MALTER
BY
ATTORNEY

United States Patent Office 2,823,306
Patented Feb. 11, 1958

2,823,306

DETECTOR CIRCUIT

Louis Malter, Princeton, N. J., assignor to Radio Corporation of America, a corporation of Delaware Application April 13, 1953, Serial No. 348,395

5 Claims. (Cl. 250—27)

The present invention is related to detector circuits, and particularly to such circuits having a useful frequency range in the microwave region.

Various detector circuits are known which adequately detect or demodulate radio frequency signals when a high energy level signal-to-noise ratio is available. For low signal-to-noise ratios, however, vacuum tube detector circuits are not so efficient as at the higher signal-to-noise ratios. At the microwave frequencies, by which is meant frequencies in excess of about 2,000 megacycles per second (mc./s.), the vacuum tube detector circuits for detection of signals with low signal-to-noise ratio are not so good as crystal detectors. The latter introduce less noise into the signal than the former. The crystal detector, however, is not able to handle high powers without damage to the crystal. Some means of detection or signal mixing which will operate well at low signal-to-noise ratios, and not subject to damage or destruction at high power levels, especially at microwave frequencies, has long been sought. Another disadvantage of crystals is that they are subject to deterioration with age.

It is an object of the present invention to provide a novel detector circuit, which has the capacity to receive high levels of radio frequency power without serious damage or deterioration, and which also has a sensitivity approaching that of a crystal detector.

Another object of the invention is to provide such a detector which is especially suitable for use at microwave frequencies.

A further object of the invention is to provide a microwave detector, efficient at low levels of energy input, and not subject to serious deterioration over long periods of time.

Another object of the invention is to provide a microwave detector efficient at low levels of energy input, and at the same time relatively impervious to damage from high level energy inputs.

Another object of the invention is to provide a novel method of detection or of mixing, and especially such a method which has especially useful applications in the microwave frequency range.

A further object of the invention is to provide a sensitive method of detection or of mixing electrical high frequency energy, especially in the microwave frequency region, which is sensitive at lower power levels, and avoids deleterious effects due to high power detection or mixing.

Another object of the invention is to provide a novel method of detection or mixing which permits the use of apparatus not subject to serious damage by the application of high power levels.

Still another object of the invention is to provide a novel method of detection or mixing which permits the use of apparatus not subject to serious deterioration over substantial periods of time.

In accordance with the invention, a gas tube with an equipotential cathode has voltages applied to it to operate the tube in either the so-called anode-glow mode or the ball-of-fire mode. These modes of operation of the tube are known, and are hereinafter more fully described so far as necessary to an understanding of the present invention. In these modes, the major portion of the space between anode and cathode of the tube is filled with a dark space or dark plasma. The radio frequency energy is coupled to the tube to increase the electron temperature in the dark plasma, and preferably with the electric vectors of the electromagnetic field of the energy parallel to the direction of electron flow in the dark plasma. When so coupled, the variations in amplitude of the electromagnetic field cause substantially instantaneous variations in the mean electron velocity or electron temperature in the dark plasma. The tube current is highly sensitive to these electron temperature variations. Thus when this tube current is passed through a suitable load impedance, and undesired radio frequency components by-passed, demodulation or mixing is readily secured. If two fields of radio frequency energy are applied each in the manner described, their beat frequency is readily recovered. As mentioned above and more fully shown hereinafter, the tube current is highly sensitive to changes in the applied radio frequency field energy. Therefore, a detector circuit according to the invention, rivals in sensitivity crystal detector circuits, but is more rugged and better withstands high power applications and is superior as regards deterioration due to ageing, than crystal detector circuits.

Further, the invention may be described as a method of securing variation of current across a load impedance for a gas tube comprising the steps of operating the tube in one of the modes having a major portion of the space between cathode and anode filled with dark plasma, simultaneously applying a radio frequency field to the dark plasma, and passing the tube anode current through the load impedance. The undesired radio frequency currents are by-passed around the load impedance. The several embodiments of the invention described hereinafter are illustrative of appropriate arrangements for coupling the R. F. field to the dark plasma to modulate the current through the tube and its load resistor.

The foregoing and other objects, advantages and novel features of the invention will be more fully apparent from the following description when taken in connection with the accompanying drawing in which similar parts bear like reference numerals, and in which:

Fig. 1 is a longitudinal cross-sectional view of one embodiment of the invention employing one way of coupling the radio frequency field;

Fig. 2 is a longitudinal cross-sectional view of another embodiment of the invention employing a different way of coupling the radio frequency field; and Fig. 3 is a transverse cross-sectional view of a different embodiment of the invention employing an auxiliary anode.

Referring to Fig. 1, a gas diode having a hermetically sealed gas-filled envelope 10 contains within it an indirectly heated equipotential cathode 12, with internal heater wires 13. A cylindrical anode 14 surrounds the cathode substantially coaxially. Leads are brought out the press of envelope 10 at one end of the gas diode tube from the anode 14 and cathode 12. A suitable source 16 provides heating current for the heater wires 13. A load impedance including a parallel connected load resistor 18 and by-pass capacitor 20 is connected in series with a suitable source of D. C. (direct current) voltage, indicated at 22, between the anode 14 and cathode 12. At the other end of the tube, a capacitive plate 24 is connected to the cathode 12 to expose an enlarged area transverse to the axis near the envelope and facing outwardly at that end. A second capacitive plate 26 of like form, outside the envelope 10, faces the plate 24. The second plate 26 terminates the inner conductor 28 of a coaxial line 30. The outer conductor 32 of coaxial line 30 is joined to a cylindrical sleeve 34 surrounding envelope 10 and coaxial with and closely spaced to the anode 14. The axes of the coaxial line 30 and anode 12 may be aligned as shown.

An understanding of the modes of operation of hot cathode gas-filled tubes may be had by reference to an article published in two parts and entitled: "Studies of externally heated hot cathode arcs," by L. Malter, E. O. Johnson, and W. M. Webster, part I of which appeared in the RCA Review for September 1951, volume XII, No. 3, pages 415–435; and part II of which appeared in the RCA Review for June 1952, volume XIII, No. 2, pages 163–182. Reference may also be made to "The Plasmatron, a continuously controllable gas-discharge developmental tube," by E. O. Johnson and W. M. Webster, published in the Proceedings of the Institute of Radio Engineers, June 1952, pages 645–659.

Briefly, and as more fully described in the said RCA Review articles, three modes of operation of a gas discharge tube may be observed. Two of these three, the anode-glow mode and the ball-of-fire mode, are found in tubes having gas pressures above about $50\mu$ ($\mu$ designates pressure in microns of mercury). Usually the anode-glow mode is not observed unless the gas pressure is above about $100\mu$. Finally, unless the gas pressure is above about $300\mu$, operation at any one of the three possible modes, including the Langmuir mode, is not clear-cut. For that reason, operation is recommended at pressures of gas in the tube above $300\mu$. Noble gases are preferred, as these do not attack the electrode materials. Argon or helium may be employed.

For different tube configurations, dimensions, and different pressures, the three modes of operation will occur at different voltages E between cathode and anode. However, the modes are visually observable and distinct. Therefore, if operation is desired in the anode-glow mode, wherein a glow appears from a thin sheath about the anode, the requisite range of voltages is readily found. The voltage E should be above ionization potential and below that at which the ball-of-fire mode occurs with increasing voltage. If the voltage providing an anode-glow mode is increased, an abrupt change to the ball-of-fire mode occurs. In the ball-of-fire mode, the glow occupies an extended region, the shape and location of which depend primarily on pressure. At low pressures, luminosity is observed over a volume which "hugs" a portion only of the anode. At higher pressures, the glow volume appears to "float" in the space between cathode and anode. At still higher pressures, say 6 mm. (of mercury) the luminosity is observed from a sphere in the space between cathode and anode. When the voltage is increased so that the current is approximately half the available cathode emission, the character of the discharge changes abruptly to the Langmuir mode in which the glow substantially fills the anode-to-cathode space except for a narrow space or sheath adjacent the cathode. Thus the anode-glow mode and the ball-of-fire mode are characterized by the major portion of the space between cathode and anode being non-luminescent. This major portion of space, as indicated in the said articles, actually is filled with a "dark plasma," as it is termed in the art. The dark plasma is a non-luminescent gas plasma of electrons and space-charge neutralizing ions.

Referring to page 175 of part II of the said articles, it may be noted that, according to the formulae there deduced, at least for small changes in the average electron velocity and assuming other factors to remain unaffected, the anode current changes as the square of the average electron velocity in the dark plasma, and the first power of the equivalent electron temperature. However, impressing radio frequency energy on or applying it to the dark plasma increases the electron temperature in this dark plasma substantially instantaneously with the energy of the applied field. Accordingly, the anode current increases substantially simultaneously with the energy of the applied field.

Referring to Fig. 1 again, a source A of radio frequency energy, which may be in the microwave frequency region, supplies energy to the coaxial line. The outer conductor 32 is coupled by sleeve 34 to the anode 14 preferably in the manner of a choke joint, with an effective quarter wavelength overlap. The capacitive plate 26 through capacitive plate 24 couples the inner conductor 28 to the cathode 12. Thus in effect the cathode 12 serves as the inner conductor and the anode 14 as the outer conductor of a continuation of the transmission line 30. Assuming propagation in the dominant TEM mode in the coaxial line and a like mode in the continuation thereof, the electric vectors of the radio frequency field are substantially parallel to the direction of electron flow in the dark plasma in the space between anode 14 and cathode 12. The radio frequency energy thus applied causes a substantially instantaneous increase of current. Small changes about some fixed value of energy thus absorbed, as caused if the course provides amplitude modulated energy, therefore, cause changes in anode current. Such explanation, though somewhat simplified, accounts for the high sensitivity of the device of Fig. 1, especially if the coupling of the radio frequency field to the tube is efficient. Whatever the explanation, the device of Fig. 1 provides a high degree of sensitivity for measurement of the coupled power level, if calibrated, and provides a highly sensitive detector. Moreover, the signal-to-noise ratio for detection is very good, especially when the tube is operated in the anode-glow mode.

A simplified qualitative physical explanation of the anode current dependency on the radio frequency field may also be offered. When the radio frequency field is applied, the mobility of electrons in the dark plasma space is increased, due to excitation by the field. This mobility in this more or less space-charge free space, causes a greater number of electrons to migrate into the glow sheath near the anode. In this anode sheath, a sharp voltage rise is believed to exist. The result is that, with more electrons available in this sheath space, they are rapidly drawn to the anode, and more anode current is drawn. The increase in electron temperature is somewhat analogous to increasing the heat or temperature of a cathode in a temperature limited vacuum didode operation. More electrons escape from the cloud at the diode cathode to the anode. So here, more electrons escape from the dark plasma space to the anode, where they are quickly taken up by the anode. When the radio frequency field energy is reduced, a converse effect takes place, and the anode current is reduced.

The changes in anode current appear across the anode load impedance, capacitor 20 and resistor 18 in parallel. Capacitor 20 by-passes the radio frequency current passing from cathode 12 to anode 14, either due to capacity coupling or to the electron mechanism just described. Thus across resistor 18 appears the modulation envelope which may be taken from across two output terminals 21. The voltage source 22 is assumed to have negligible radio frequency impedance, or may be suitably by-passed.

Although operation in the anode-glow mode is preferred, as it is highly sensitive, by suitable adjustment of the voltage E, operation in the ball-of-fire mode also gives good results. The physical explanation is believed to be similar. The increase of electron temperature in the dark plasma causes more electrons to migrate into the region near the anode where they contribute to the increased anode current, and vice versa when the radio frequency field is reduced.

Referring to Fig. 2, the diode is similar to that of Fig. 1 in its gas-filled envelope 10 and anode 14, and in its cathode 12, which is preferably of the oxide coated type and again positioned coaxially of the anode 14. The heater windings 13 within the tube has leads brought out through the press of the envelope 10, as before. A suitable source, which may be an alternating current source conventionally indicated at 38, may provide heater current through a conventional transformer. In the arrangement of Fig. 2, a lead from the cathode 12 is brought out the envelope at the end opposite the press and connected to the inner conductor 28 of the coaxial line 30. The anode 14 is sealed through the envelope 10 and continued to a quarter wave capacitive type choke joint 40 of known type coupling the anode 14 to the outer conductor 32. The anode voltage is thus blocked from the outer conductor 32. The tube anode and cathode again form what may be considered a continuation of the coaxial line 30.

In the operation of the arrangement of Fig. 2, the voltage of source 22 is adjusted for operation of the gas-diode preferably in the anode-glow mode, although the source 22 may be adjusted for operation of the gas diode in the ball-of-fire mode. Energy from the source A, as before, is coupled to the tube to impress the radio frequency field on the dark plasma. The resulting increase in the electron temperature in the dark plasma causes an increase in the anode current. Changes in the energy of the radio frequency field causes changes in the anode current. The energy from the source A, if modulated, may therefore be demodulated, and the output taken from the output terminals 21 as before.

If a beat frequency is to be detected, a second source B, say from a local oscillator, may be coupled to the transmission line 30 by a capacitive type coupling 42. In this case, the radio frequency energy from both sources A and B is coupled to the gas diode. The total instantaneous radio frequency energy applied to the dark plasma may be considered as changing with the beat frequency. The dark plasma electron temperature responds substantially instantaneously to the total energy applied from both sources A and B. The currents through the load impedance of capacitor 20 and resistor 18 varies with the beat frequency. The capacitor 20 and resistor 18 values are proportioned in known fashion to by-pass currents of the frequencies of the sources A and B and to offer appreciable impedance to the currents of the beat frequency. Therefore, the beat frequency is detected and may be taken from the output terminals 21. This beat frequency may now be applied to suitable I. F. stages, and demodulated, as desired. It is also apparent that by a similar coupling 42 similar application of two radio frequency energies may be used in Fig. 1, if a beat frequency is to be detected.

Referring to Fig. 3, the anode 14 is segmented, a portion, for example, of 20 or 30 degrees in extent being omitted. An auxiliary anode 44 is provided in the gap in anode 14. The auxiliary anode 44 may extend axially for only a short distance, or preferably it may extend substantially the axial extent of the anode 14. The anode 14 may be coupled to the coaxial line 30 as shown in Fig. 1 or 2. The portion external to the envelope 10, if coupled as in Fig. 2, may be completed circumferentially, as it cannot thus short-circuit to the auxiliary anode. The leads are schematically indicated in Fig. 3 as brought out the cylindrical wall of envelope 10, but many ways are known of securing these connections.

In Fig. 3, the operation may be as before, except that the auxiliary anode 44 is employed to maintain an anode-glow mode discharge, or to maintain a ball-of-fire mode discharge, between cathode 34 and the auxiliary anode 44. A dark plasma results from this discharge which diffuses over a substantial space in the tube and which supports a current flow between the cathode 34 and the primary anode 14. The electron temperature of this dark plasma is affected by the radio frequency field applied to it. The primary anode current therefore varies with the energy of the applied field. One D. C. voltage source 46, schematically indicated, is connected between the cathode 34 and the auxiliary anode 44, to maintain the plasma supplying discharge. A current limiting resistor 50 shunted by a by-pass capacitor 52 is placed in series with the auxiliary anode D. C. source 46. The primary anode voltage source 48 may be smaller.

In selecting the voltage of a source such as 22 (Fig. 1 or 2) or that of sources 46 and 48 of Fig. 3, and the value of load resistor 18, the effect of the mean expected increase of current due to the mean value of the energy coupled from the radio frequency field or fields should be taken into account. If the voltage swing across the load resistor induced by the swing of the applied radio frequency field is not very great, then these values are not so critical. The voltage of the source less the voltage drop across the resistor may be chosen so that E (Fig. 1 or 2) is near the mid-range of the voltage between cathode and anode providing the desired mode of operation of the tube. If the expected current swings are large, the value of the load resistor 18 must be smaller, to prevent the voltage swing of E for carrying the tube into a different mode of operation. Also, if the mean value of the current is large, the value of the load resistor 18 is preferably reduced, so that E is certain to fall in the desired range. In Fig. 3 similar considerations prevail. The resistor 50, however, is desirably by-passed by a capacitor 52 related to the value of resistor 50 so that the voltage applied to auxiliary anode 44 is relatively unchanged with variations of the radio frequency energy amplitude. The proper values for any given range of frequencies of the changes in the radio frequency energy is readily calculated in accordance with known engineering principles, when the tube characteristics are known. In each case, however, the selected values will depend, not only on the tube configuration, gas pressure, and other factors, easily ascertained, but also on the degree to which the radio frequency energy is coupled and the variations to be expected in such energy.

As one example, using a tube having anode dimensions of one inch in length and one inch in diameter, and helium gas at a pressure of one millimeter of mercury, the following circuit values may be employed, for operation in the anode-glow mode, if the incident radio frequency energy which may be attenuated by known means if too high has a suitable level:

Voltage at source 22, 50 volts;
Capacitor 20, 500 micromicrofarads;
Resistor 18, 5000 ohms.

The load resistor 18 and capacitor 20 are selected for high impedance to voice frequency signals and low impedance to radio frequency signals.

It will be apparent that the invention provides a novel means and method of detecting radio frequency energy. Gas tubes are not subject to so rapid deterioration as crystals. Hence detector circuits according to the invention have a long life with little maintenance. Furthermore, an excess of radio frequency energy applied to the circuit may overload following stages, but the circuit itself is not damaged, and the gas tube is relatively impervious to injury from this cause, as compared to crystal detectors. Moreover, especially when the anode-glow mode of operation is employed, the noise level is low, unlike other forms of gas discharge which generate noise.

What is claimed is:

1. A detector comprising a gas diode having a sealed envelope, a gas within said envelope, an anode within said envelope, and an equipotential cathode within said envelope, means to heat said cathode, a load impedance, means to apply a voltage in series with said impedance between said anode and cathode to operate the tube in a mode having the major portion of the space between cathode and anode filled with a dark plasma, and means to couple a radio frequency electromagnetic energy field to said tube to apply said field to said dark space, said anode being cylindrical and surrounding and substantially coaxial with said cathode, said means for applying a radio frequency field comprising a coaxial line having inner and outer conductors, said outer conductor being coupled to said anode, and said inner conductor being coupled to said cathode.

2. The detector claimed in claim 1, said anode having a cylindrical extension sealed through said envelope, and said anode coupling to said coaxial line in a capacitive type choke joint.

3. The detector claimed in claim 2, said cathode having a lead sealed through said envelope coaxially with said anode extension and connected by direct contact to said inner conductor.

4. The detector claimed in claim 1, said anode coupling comprising a metallic sleeve surrounding said anode coaxially and outside said envelope, said sleeve being connected by direct contact to said outer conductor, whereby said sleeve is coupled to said anode in a capacitive choke joint type of coupling.

5. The detector claimed in claim 1, said coaxial line having its inner conductor terminated in a metallic plate outside said envelope, a metallic plate inside said envelope connected to said cathode, the two plates facing each other with said envelope interposed between them, the said coupling of said inner conductor to said cathode including said plates.

References Cited in the file of this patent

UNITED STATES PATENTS

| | | |
|---|---|---|
| 1,144,596 | Hewitt | June 29, 1915 |
| 1,741,481 | Schmeirer | Dec. 31, 1929 |
| 2,106,770 | Southworth et al. | Feb. 1, 1938 |
| 2,123,242 | Hollman | July 12, 1938 |

OTHER REFERENCES

Malter et al.: Studies of Externally Heated Hot Cathode Arcs, R. C. A. Review, vol. 12, No. 3, pages 415 to 435 (September 1951).